(12) United States Patent
Chaloux et al.

(10) Patent No.: US 11,390,636 B2
(45) Date of Patent: Jul. 19, 2022

(54) ORGANIC SOLVENT PROCESSABLE CARBON PHOSPHONITRIDE PRE-POLYMERS

(71) Applicant: The Government of the United States of America, as represented by the Secretary of the Navy, Arlington, VA (US)

(72) Inventors: Brian L. Chaloux, Alexandria, VA (US); Albert Epshteyn, Potomac, MD (US); Thomas J. Dabrow, College Park, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/443,750

(22) Filed: Jul. 27, 2021

(65) Prior Publication Data

US 2022/0048934 A1 Feb. 17, 2022

Related U.S. Application Data

(60) Provisional application No. 63/066,700, filed on Aug. 17, 2020.

(51) Int. Cl.
*C07F 9/50* (2006.01)

(52) U.S. Cl.
CPC .................................. *C07F 9/5036* (2013.01)

(58) Field of Classification Search
CPC ....................................................... C07F 9/5036
USPC .......................................................... 558/303
See application file for complete search history.

(56) References Cited

U.S. PATENT DOCUMENTS

| | | | |
|---|---|---|---|
| 9,409,936 B2 | 8/2016 | Epshteyn et al. |
| 9,567,359 B2 | 2/2017 | Epshteyn et al. |
| 10,249,403 B2 | 4/2019 | Epshteyn et al. |
| 10,510,458 B2 | 12/2019 | Epshteyn et al. |

*Primary Examiner* — Kristin A Vajda
(74) *Attorney, Agent, or Firm* — US Naval Research Laboratory; Roy Roberts

(57) ABSTRACT

Described herein is the preparation of carbon phosphonitride pre-polymers that are soluble in organic solvents and can be further thermoset into carbon phosphonitride extended solids (i.e. films, monoliths, etc.) with an approximate empirical formula of $C_3N_3P$.

7 Claims, 2 Drawing Sheets

US 11,390,636 B2

ORGANIC SOLVENT PROCESSABLE CARBON PHOSPHONITRIDE PRE-POLYMERS

CROSS-REFERENCE TO RELATED APPLICATIONS

This Application claims the benefit of U.S. Provisional Patent Application No. 63/066,700 filed on Aug. 17, 2020 which is incorporated herein by reference in its entirety. This Application is related to commonly-owned U.S. Pat. Nos. 10,510,458; 10,249,403; 9,567,359; and 9,409,936.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 111208.

BACKGROUND

Carbon phosphonitride is a new material type as described in U.S. Pat. Nos. 9,567,359; and 9,409,936. It is related to a class of materials called carbon nitrides comprising carbon and nitrogen, the most prevalent carbon nitride having the empirical formula $C_3N_4$. Pure $C_3N_3P$ material (similar to $C_3N_4$ with one N substituted with a P) can be made directly from the thermal self-reaction of tricyanophosphine ($P(CN)_3$). This can be accomplished as a direct solid-solid transformation (U.S. Pat. No. 9,409,936) or as a film growth process on oxide-terminated substrates from solutions of tricyanophosphine (U.S. Pat. No. 9,567,359). Described herein is a new method of producing a soluble form of partially polymerized carbon phosphonitride.

BRIEF SUMMARY

Described herein is a method of producing a soluble form of partially polymerized carbon phosphonitride that can be manipulated by dissolution in certain polar aprotic solvents. Solutions of this oligomeric form of carbon phosphonitride (hereafter designated as 'pre-polymer') can then be cast into films, molds, or can be used to print the material. This is a desirable method of manipulating this material.

In one embodiment, a method of preparing the pre-polymer includes reacting potassium cyanide with phosphorus trichloride in a polar aprotic solvent (such as acetonitrile), thereby obtaining a pre-polymer comprising phosphorus, carbon, and nitrogen.

In another embodiment, a method of preparing a pre-polymer includes reacting silver cyanide with phosphorus trichloride in a polar aprotic solvent, thereby obtaining a pre-polymer comprising phosphorus, carbon, and nitrogen. Optionally, a lesser quantity of metal nitrate, such as silver nitrate, may be added in addition to silver cyanide, thereby obtaining a pre-polymer comprising phosphorus, carbon, nitrogen, and small quantities of oxygen.

DETAILED DESCRIPTION

Definitions

Figures 1A, 1B:
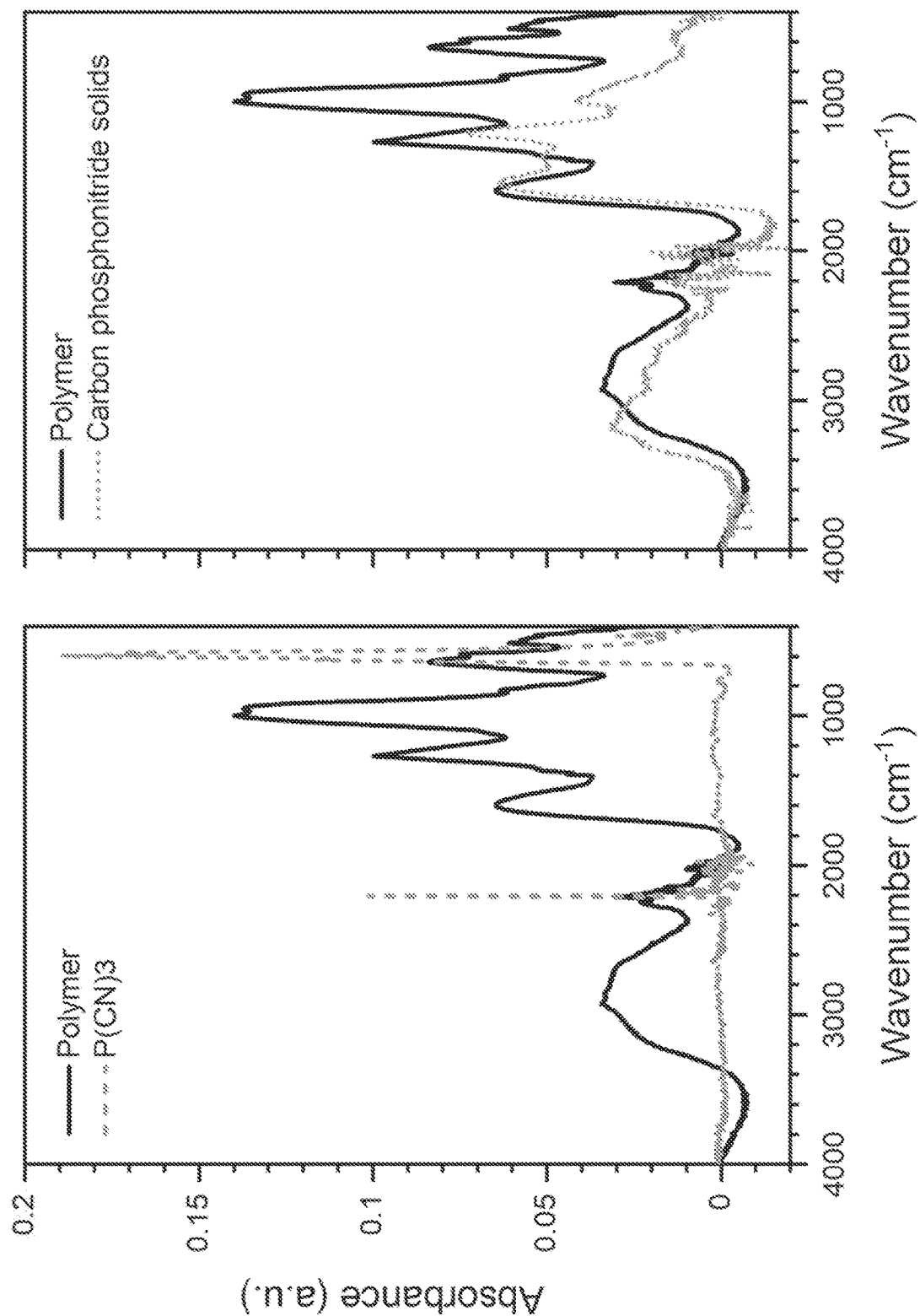
FIGS. 1A and 1B compare the IR spectrum of a pre-polymer (obtained from the reaction of silver cyanide with phosphorus trichloride) with $P(CN)_3$ and $C_3N_3P$, respectively.
Figure 2:
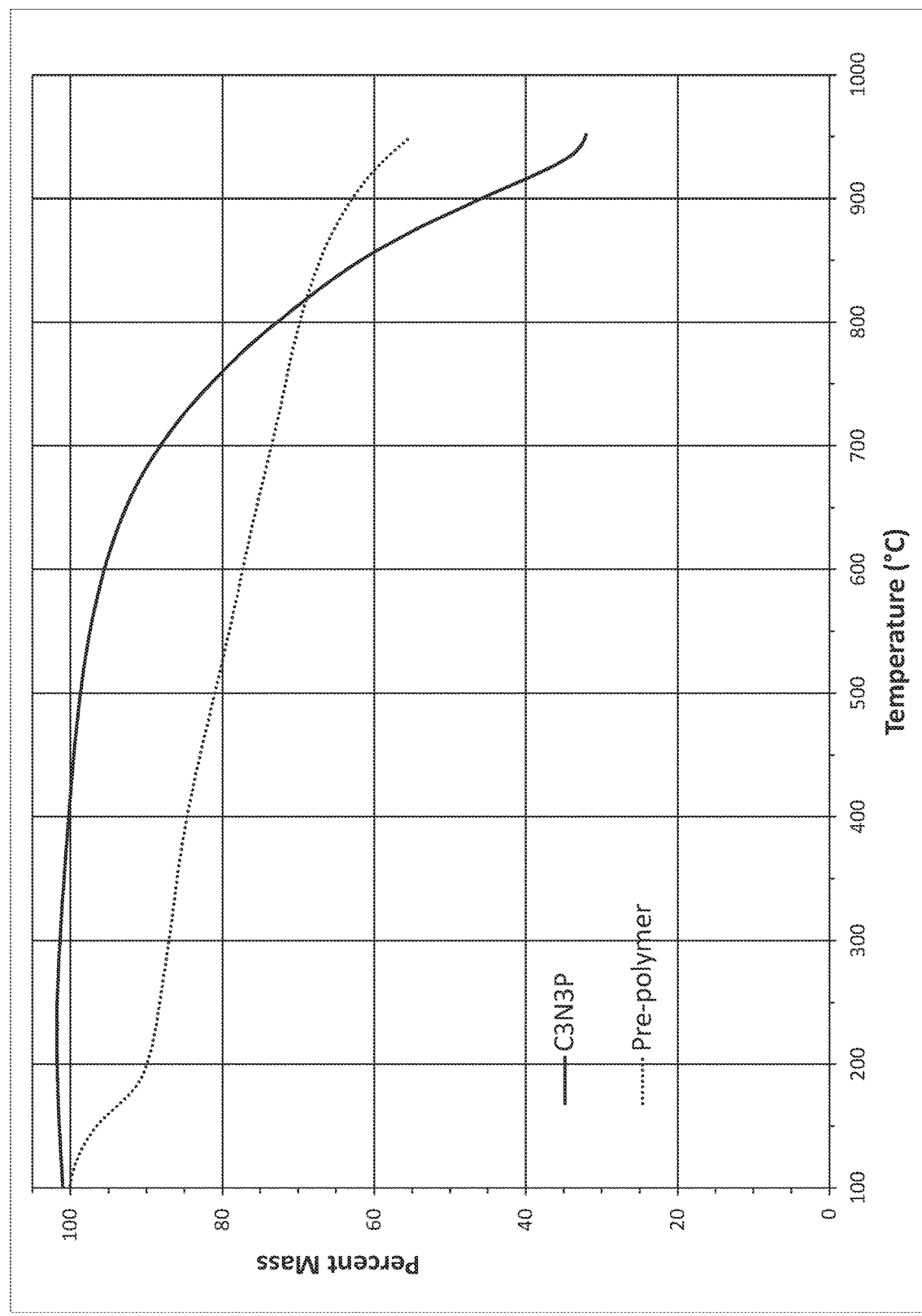
FIG. 2 is a thermogravimetric analysis of the uncured pre-polymer as compared to $C_3N_3P$.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

A new method, operable at ambient pressure, prepares carbon phosphonitride pre-polymers that are soluble in organic solvents and can be further thermoset into carbon phosphonitride extended solids (i.e. films, monoliths, etc.) with an approximate empirical formula of $C_3N_3P$.

In various embodiments, the C:N:P molar ratio of the pre-polymer is 3:3:1, wherein the individual elemental components are present within a range of up to +/−10% from this ideal ratio. For example, they may be present in within limits of +/−5%, or 4%, or 3%, or 2%, or 1% from the ideal ratio.

In further embodiments, the pre-polymer consists essentially of C, N, and P, without significant quantities of other components.

There are two main types of the carbon phosphonitride pre-polymer developed. They differ significantly in their relative solubility in the appropriate solvents (such as acetonitrile), which was shown is due to the different concentration of ionic moieties present in the respective pre-polymers. The more ionic character the pre-polymer has, the less soluble it is in organic solvents. The below examples detail the two methods for generating the carbon phosphonitride pre-polymers.

EXAMPLES

Example A: Ionic Pre-Polymer, Prepared with KCN and $PCl_3$

In a nitrogen-filled drybox, 75.0064 grams of anhydrous, powdered KCN (1.1518 mol) and 250 mL anhydrous acetonitrile were added to a 500 mL reaction bulb. 51.00 mL (80.07 grams, 0.5830 mol) of phosphorus trichloride were added to the reaction mixture. The bulb was sealed under $N_2$, then immersed in a sonochemical reactor chilled by a recirculation bath to 10° C. The reaction was ultrasonicated for 64 hours at 200 W/10 gal power setting.

The remaining volatiles (acetonitrile and excess $PCl_3$) were evaporated under reduced pressure. Under $N_2$, the remaining red-brown solids were crushed with a mortar & pestle then transferred to a large sublimator. Phosphorus tricyanide was sublimed at 100° C. onto a cold finger chilled with cold air and isolated in 19.7% overall yield (8.24 grams) versus $PCl_3$.

To the remaining solids, 250 mL of anhydrous acetonitrile were added and the insoluble solids removed by gravity filtration through a coarse paper filter. The resulting solution was further suction filtered through a coarse glass fritted funnel, the filtrate chilled to −20° C. overnight, and the solution re-filtered to removed settled solids. Solvent was evaporated from the deep red solution under reduced pressure and 15.2005 grams of ionic pre-polymer (36.3% on a mass basis versus $PCl_3$) were isolated as a flaky, dark red powder.

Example B: Synthesis of Neutral Pre-Polymer, Prepared with AgCN and $PCl_3$

Silver cyanide was freshly prepared from silver nitrate and potassium cyanide by slow, dropwise addition of 400 mL of a 2.5 M $AgNO_{3(aq)}$ (174 grams $AgNO_3$, 1.02 mol) solution to 400 mL of a rapidly-stirring 2.5 M $KCN_{(aq)}$ (69.4 grams KCN, 1.07 mol) solution chilled in an ice bath. The clumpy, white solids were isolated on a flitted filter funnel by suction filtration then washed successively with portions of deionized water, ethanol, and diethyl ether. The wet solids were transferred to a plastic container and dried at 60° C. in a vacuum oven overnight. The final, grey powder was weighed at 128.17 grams (94% isolated yield). Powder X-ray diffraction exhibited only peaks for AgCN, and ATR-IR spectroscopy confirmed it to be free of water, ethanol, and diethyl ether.

In a nitrogen-filled drybox, 86.5 grams AgCN (0.6461 mol) and 200 mL anhydrous acetonitrile were added to a 3-neck, 500 mL round-bottom flask. 20.0 mL of phosphorus trichloride (31.48 grams, 0.2292 mol) were separately transferred into a syringe. The flask was removed from the box, fitted with a water-cooled reflux condenser (under $N_2$ flow), a mechanical stirrer, and a rubber septum then subsequently placed into a heating mantle. While stirring, the $PCl_3$ was slowly added to the flask via the septum. The cloudy suspension was gradually heated to reflux and held at temperature for 48 hours.

The 3-neck flask was fitted with septa and transferred (under $N_2$) back to the drybox. Insoluble solids (primarily AgCl) were suction filtered off from the reaction mixture on a fitted glass filter funnel and washed with several aliquots of acetonitrile. The combined filtrate was evaporated to dryness under reduced pressure, yielding dark red-brown solids. The solids were transferred to a sublimator and $P(CN)_3$ sublimed from the cake at 100° C. under dynamic vacuum. 8.212 grams (75.32 mmol, 33% isolated yield vs. $PCl_3$) of $P(CN)_3$ were isolated as a white solid. The unsublimed red-brown solids were taken back up in acetonitrile, refiltered, and dried at reduced pressure, yielding 16.790 grams (0.1540 mol, 67% isolated yield vs. $PCl_3$) of neutral pre-polymer.

Example C: Synthesis of Neutral Pre-Polymer, Prepared with AgCN, $PCl_3$, and $AgNO_3$ Silver cyanide (which can be prepared as described above or purchased from a commercial vendor) was purified by stirring in boiling water for 3 hours to remove water-soluble salts. The resulting powder was collected by suction filtration and stirred over ethanol for 16 hours at room temperature to remove residual water, then dried under vacuum at 60° C. to yield a fluffy, off-white powder.

In a nitrogen drybox, 10.0 grams of purified AgCN (74.69 mmol), 0.100 grams silver nitrate (0.589 mmol, Fisher Scientific), and 25 mL anhydrous acetonitrile (Sigma-Aldrich) were added with a stirbar to a 50 mL Schlenk flask. Separately, 2.2 mL $PCl_3$ (3.463 grams, 25.22 mmol) were taken into a syringe. The flask was fitted with a water-chilled reflux condenser and stirred under nitrogen in an oil bath. The $PCl_3$ was added and the solution heated to reflux for 48 hours.

The resulting dark red solution was separate from the insoluble solids and $P(CN)_3$ and oligomers isolated as described in Example B. 1.083 grams (9.933 mmol, 39.4% isolated yield) of $P(CN)_3$ were isolated as a white solid and 1.172 grams (10.75 mmol, 42.6% isolated yield) of neutral pre-polymer were isolated as a red-brown powder.

Further Embodiments

One can thermoset the pre-polymer into a solid carbon phosphonitride.

Solvents are not limited to acetonitrile. Polar aprotic solvents with high solvating power, such as pyridine, dimethoxyethane, and benzonitrile, may also be used. Low polarity aprotic solvents, such as diethyl ether, are disfavored due to low solubility of intermediates and products. Protic solvents (alcohols, primary amines, and secondary amines) are known to react with $PCl_3$, $P(CN)_3$, and cyanophosphine oligomers, and are thus incompatible with reaction conditions. Amides (e.g. dimethylformamide) are known to react with these compounds, as well.

Variable concentrations of $AgNO_3$ (0-100 mol % with respect to CN) may be used as an additive. At high proportions of $AgNO_3$ to $PCl_3$, phosphate formation is favored to cyanophosphine formation, changing product chemistry and increasing the rate of heat release at early stages of the reactions. Concentrations of reactants may also vary. Although reactions are typically run with CN-to-$PCl_3$ ratios close to 3:1 (stoichiometric), they may also be run in a slight excess of either reagent.

Other metals may be substituted for silver in reactions employing $AgNO_3$, for example Li, Na, K, etc.

Reactions may be performed at different temperatures. However, reactions involving AgCN are preferentially run hot to increase the rate of reaction, whereas reactions involving KCN are preferentially run chilled to minimize gel formation.

The pre-polymers can be used to make monolithic materials after thermosetting, for example after consolidation of the pre-polymer by printing or pressing. In further embodiments, the pre-polymer can be used as a binder for other materials (for example, carbon fiber, ceramic powders, etc.) to create a composite material.

Advantages

These pre-polymers are inorganic materials with the thermal, chemical, and mechanical properties of ceramics, but also solubility similar to organic polymers.

As compared to the presently described materials, the ionic carbon phosphonitride of U.S. Pat. Nos. 9,567,359; and 9,409,936 exhibits different chemistry and properties, being less temperature stable, more brittle, and less chemically stable. The pre-polymer prepared as described is stable to over 700° C. in air. It is also a rather hard material with a range of other interesting physical properties including lack of flammability. The development of this pre-polymer—based method of manipulation of carbon phosphonitride marks a significant advance in the technological development of producing monolithic carbon phosphonitride in any desired form factor.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of preparing a pre-polymer, the method comprising:
    reacting potassium cyanide with phosphorus trichloride in a polar aprotic solvent, thereby obtaining a pre-polymer consisting essentially of phosphorus, carbon, and nitrogen.

2. The method of claim 1, wherein the solvent is acetonitrile.

3. A method of preparing a pre-polymer, the method comprising:
    reacting silver cyanide with phosphorus trichloride in a polar aprotic solvent, thereby obtaining a pre-polymer comprising phosphorus, carbon, and nitrogen.

4. The method of claim 3, wherein the solvent is acetonitrile.

5. The method of claim 3, further comprising the inclusion of a metal nitrate in the reaction of the silver cyanide with phosphorus trichloride.

6. The method of claim 5, wherein the metal nitrate is silver nitrate.

7. The method of claim 5, wherein the solvent is acetonitrile.

* * * * *